(12) United States Patent
Yeh et al.

(10) Patent No.: US 7,954,784 B2
(45) Date of Patent: Jun. 7, 2011

(54) SHOCK ABSORBER

(75) Inventors: Chin-Wen Yeh, Taipei Hsien (TW); Zhen-Neng Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 599 days.

(21) Appl. No.: 11/858,132

(22) Filed: Sep. 20, 2007

(65) Prior Publication Data

US 2009/0059506 A1 Mar. 5, 2009

(30) Foreign Application Priority Data

Aug. 28, 2007 (CN) .................. 2007 2 0200890 U (51) Int. Cl.
*F16M 13/00* (2006.01)
*G06F 1/16* (2006.01)
(52) U.S. Cl. ................... 248/635; 248/632; 361/679.34; 411/103
(58) Field of Classification Search .................. 248/559, 248/632, 635, 636, 638, 27.3, 539; 361/679.34, 361/679.35, 679.36, 685; 403/194; 285/82, 154.4; 360/97.02

See application file for complete search history.

(56) References Cited

U.S. PATENT DOCUMENTS

| | | | | |
|---|---|---|---|---|
| 2,687,862 | A * | 8/1954 | Crowther | 248/27.3 |
| 4,610,588 | A * | 9/1986 | Van Buren et al. | 411/173 |
| 4,630,338 | A * | 12/1986 | Osterland et al. | 24/293 |
| 5,366,200 | A * | 11/1994 | Scura | 248/632 |
| 6,899,499 | B2 * | 5/2005 | Dickinson et al. | 411/182 |
| 7,618,138 | B2 * | 11/2009 | Rodriguez et al. | 347/88 |
| 7,639,490 | B2 * | 12/2009 | Qin et al. | 361/679.34 |
| 7,688,577 | B2 * | 3/2010 | Wang | 361/679.35 |
| 2008/0117778 | A1 * | 5/2008 | Lee et al. | 369/53.17 |

* cited by examiner

Primary Examiner — Tan Le
(74) Attorney, Agent, or Firm — Frank R. Niranjan (57) ABSTRACT

A shock absorber (20) includes a fastener (10) and a resilient gasket (30) for receiving the fastener. The fastener includes a shaft (15). The gasket includes an axial portion (31) surrounding the shaft of the fastener and a plurality of resilient tabs (35) extending from the axial portion. Each resilient tab includes an extending portion (351) extending from the axial portion, a bent portion (353) extending outward from the extending portion, and a resilient contacting portion (355) further extending backward from the bent portion and keeping a distance from the extending portion in a direction vertical to the axial direction of the fastener.

7 Claims, 8 Drawing Sheets

SHOCK ABSORBER

BACKGROUND

1. Field of the Invention

The present invention relates to shock absorbers, and more particularly to a durable shock absorber.

2. Description of Related Art

Various data storage apparatuses are installed in computers for communication and handling of data. Such apparatuses include, for example, hard disk drives, floppy disk drives, and CD-ROM drives.

Conventionally, a data storage apparatus is directly installed in a mounting bracket of a computer with bolts. The combined mounting bracket and the data storage apparatus is then attached to a computer enclosure. Gaps unavoidably exist between the bolts and the mounting bracket.

The data storage apparatus stores and retrieves large amounts of information that can be accessed in milliseconds. When the computer is subjected to shock, the data storage apparatus sustains shock relative to the mounting brackets as a result of the gaps that exist between the bolts and the mounting bracket. Such shock can magnify the shock acting on the computer. Currently, a resilient gasket made of plastic or some other soft materials, receives the bolt for absorbing shock.

However, the resilient gasket made of plastic too easily wears out over time.

What is needed, therefore, is a durable shock absorber.

SUMMARY

A shock absorber includes a fastener and a resilient gasket for receiving the fastener. The fastener includes a shaft. The gasket includes an axial portion surrounding the shaft of the fastener and a plurality of resilient tabs extending from the axial portion. Each resilient tab includes an extending portion extending from the axial portion, a bent portion extending outward from the extending portion, and a resilient contacting portion further extending backward from the bent portion and keeping a distance from the extending portion in a direction vertical to the axial direction of the fastener.

Other advantages and novel features will be drawn from the following detailed description of an embodiment with attached drawings, in which:

DETAILED DESCRIPTION

Figure 1:
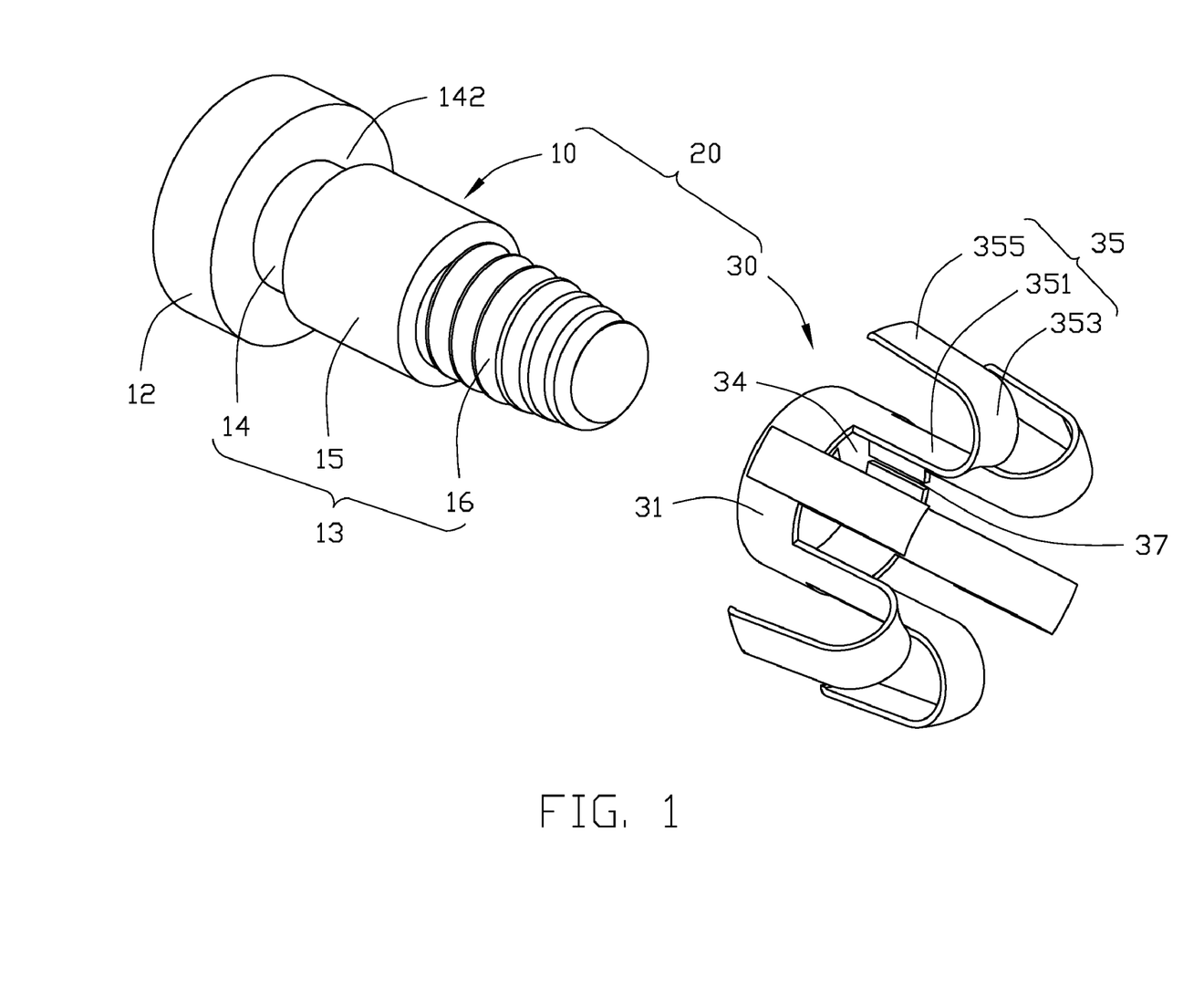
FIG. 1 is an exploded, isometric view of a shock absorber of a first embodiment of the present invention, including a fastener, and a resilient gasket.

Referring to FIG. 1, a shock absorber 20 in accordance with a first embodiment of the present invention includes a fastener 10 and a resilient gasket 30.

The fastener 10 includes a head 12 and a screw rod 13. The screw rod 13 includes a connecting portion 14, a shaft 15 extending from the connecting portion 14, and a threaded stud 16 extending from the shaft 15. The connecting portion 14 is smaller in cross-section than the head 12 and the shaft 15, thereby forming a notch 142 thereamong.

The resilient gasket 30 includes an annular axial portion 31 for surrounding the shaft 15 and a plurality of "U"-shaped resilient tabs 35 extending from a circular edge of the axial portion 31. A gap 37 cuts through the axial portion 31 to make the axial portion 31 open along an axial direction of the axial portion 31 to allow resilient deformation of the axial portion 31. The axial portion 31 is slightly smaller in diameter than the shaft 15. An opening 34 is defined between two adjacent resilient tabs 35. Each resilient tab 35 includes an extending portion 351 extending forward in the axial direction of the axial portion 31, a bent portion 353 extending outward and backward from the extending portion 351, and a resilient contacting portion 355 extending backward from the bent portion 353 parallel to the extending portion 351 and keeping a distance from the extending portion 351 in a direction vertical to the axial direction of the fastener 10.

Figure 2:
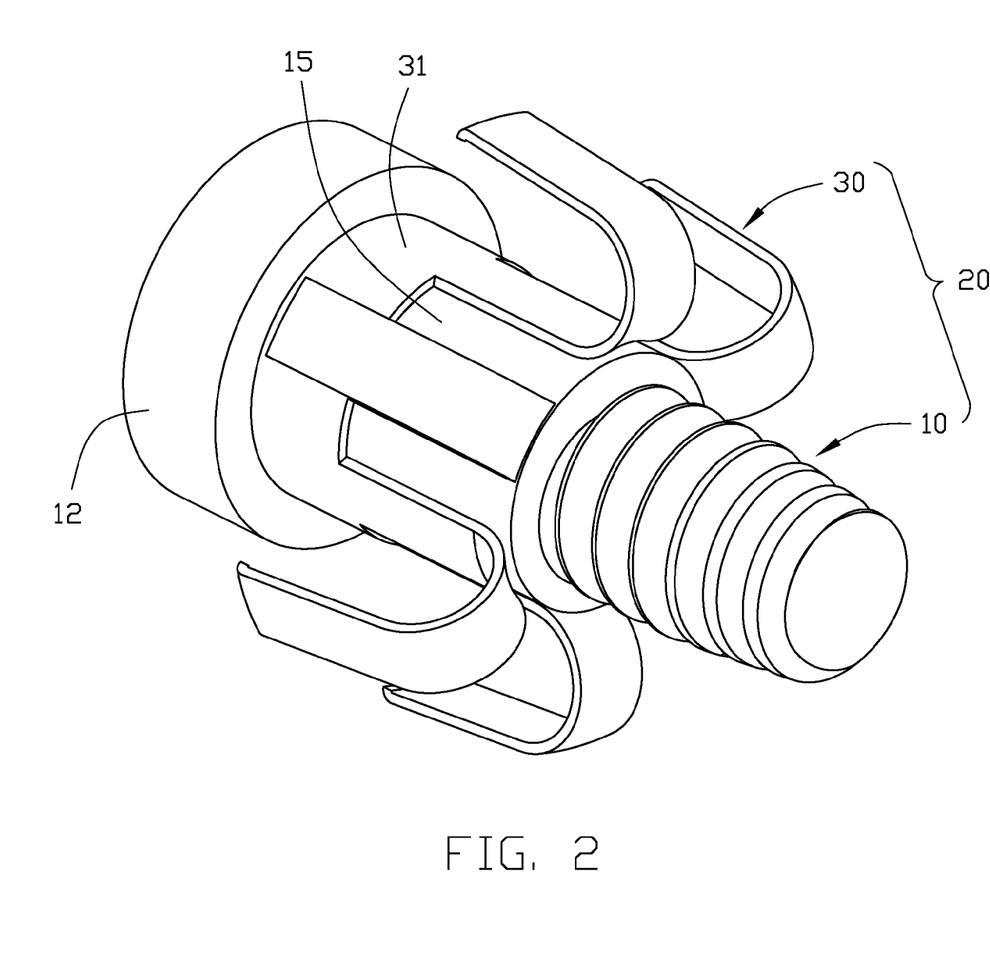
FIG. 2 is an assembled isometric view of FIG. 1.

Referring also to FIG. 2, in assembly, the fastener 10 is aligned with the resilient gasket 30. When the shaft 15 of the fastener 10 is inserted in the axial portion 31 of the resilient gasket 30, the axial portion 31 is pressed to be deformed outward, thanks to the gap 37, to form a larger area for receiving the shaft 15 of the fastener 10. Then the shaft 15 of the fastener 10 is soldered to the axial portion 31 of the resilient gasket 30, thereby forming the shock absorber 20.

Figure 3:
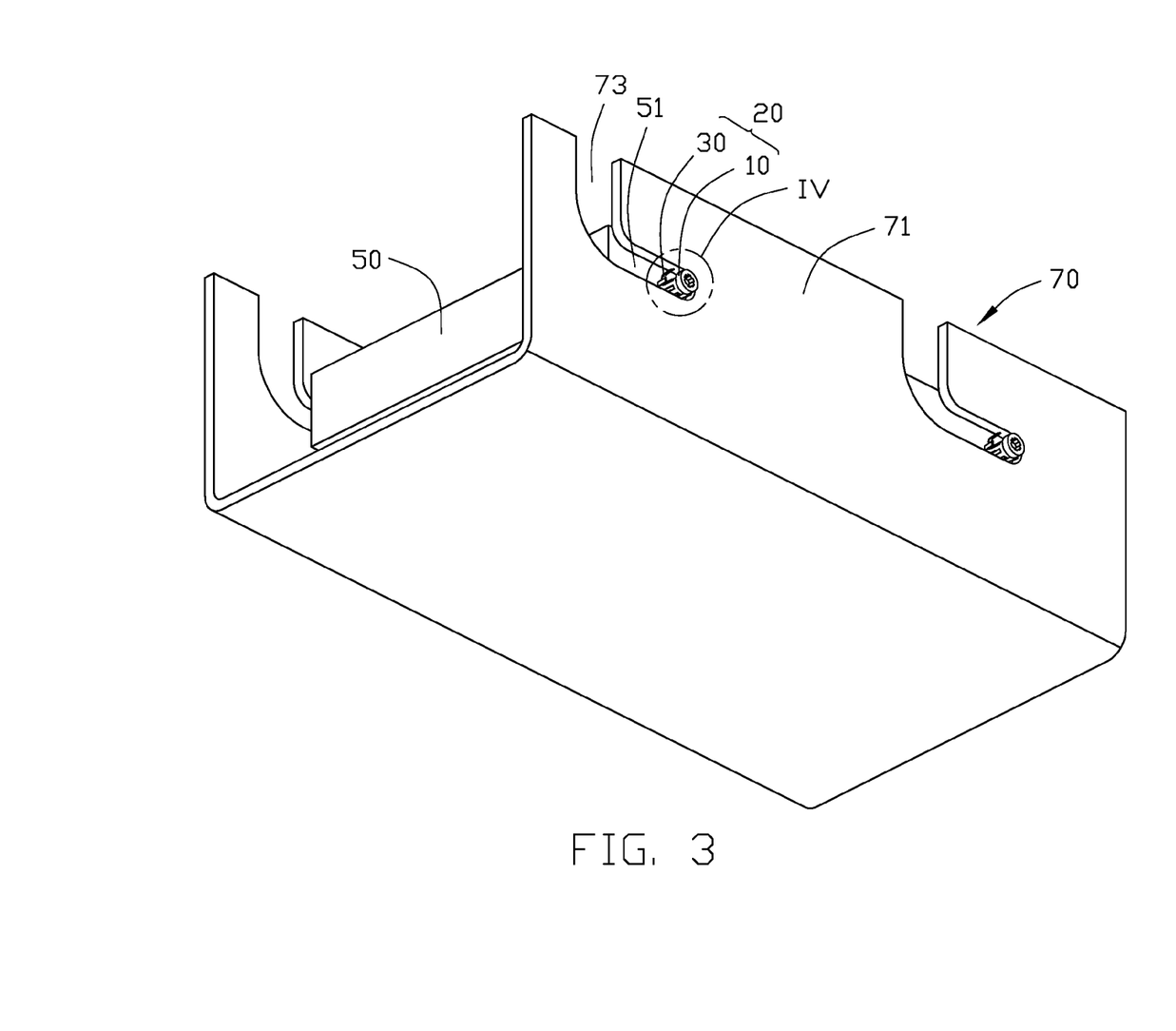
FIG. 3 is an assembled isometric view of the shock absorber secured on a data storage apparatus mounted on a drive bracket.
Figure 4:
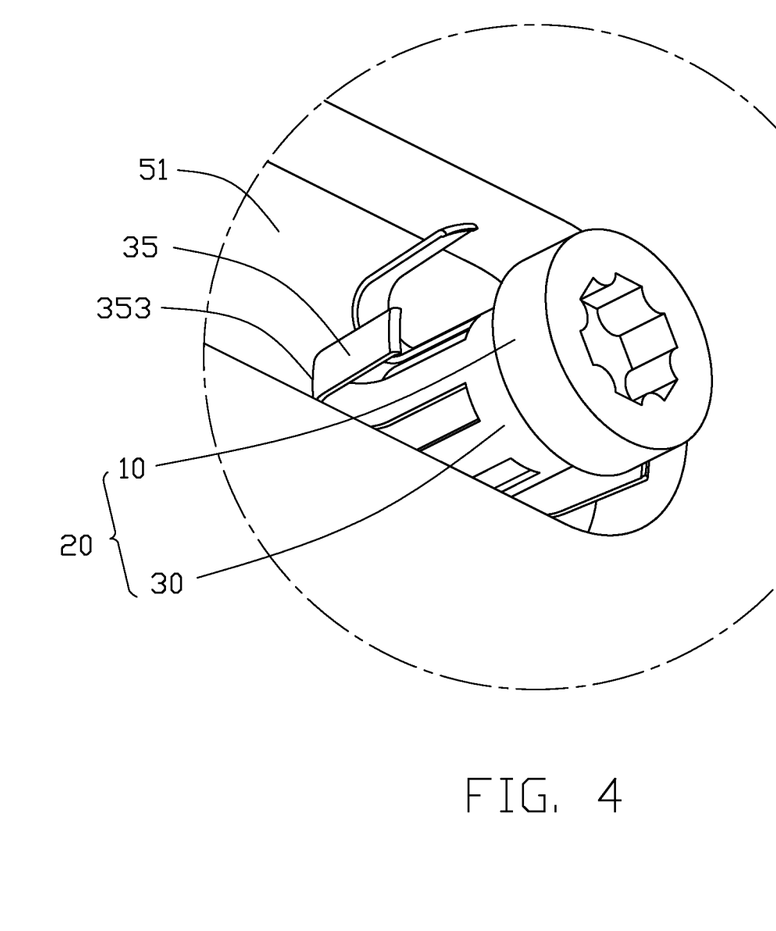
FIG. 4 is an enlarged view of an encircled portion IV of FIG. 3.

Referring also to FIGS. 3 and 4, a data storage apparatus 50 includes two sides 51 each defining two screw holes for engaging with four shock absorbers 20 respectively. The drive bracket 70 includes a pair of side panels 71. Two L-shaped sliding slots 73 are defined in each side panel 70 corresponding to the screw holes of the sides 51 of the data storage apparatus 50.

In assembly of the data storage apparatus 50 to the drive bracket 70, the screw studs 16 of the fasteners 10 are screwed into the screw holes of the data storage apparatus 50 respectively. At the same time, the bent portions 353 of the resilient gasket 35 resist resiliently against the sides 51 of the data storage apparatus 50.

Then the data storage apparatus 50 is mounted to the drive bracket 70 with the shock absorbers 20 sliding in the sliding slots 73 of the side plates 71 of the drive bracket 70 respectively. The contacting portions 355 of the resilient gaskets 30 of the shock absorbers 20 are deformed to resist edges of the sliding slots 73. The shock absorbers 20 secured on the data storage apparatus 50 are used for absorbing shock between the data storage apparatus 50 and the drive bracket 70, as described below.

When the data storage apparatus 50 is shocked relative to the drive bracket 70 in a first direction vertical to the axial direction of the fastener 10, the contacting portions 355 of the resilient gaskets 30 are deformed vertical to the axial direction of the fastener 10 to absorb shock. When the data storage apparatus 50 is shocked in a second direction parallel to the axial direction of the fastener 10, the bent portions 353 of the gasket resist against the sides 50 to be deformed to absorb shock.

Figure 5:
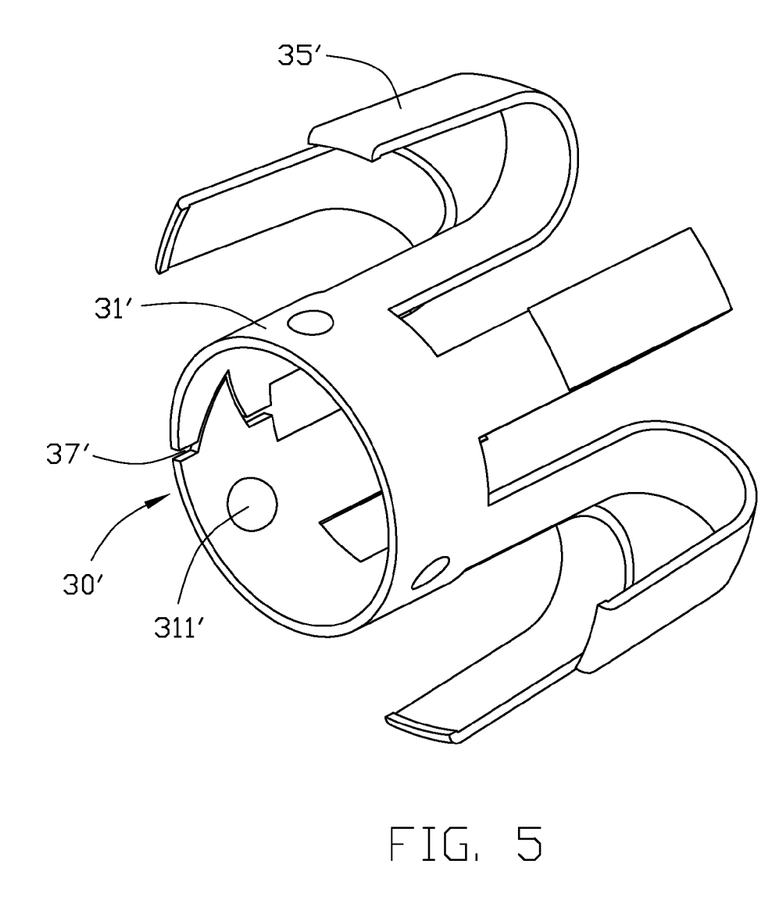
FIG. 5 is an isometric view of a resilient gasket of a shock absorber of a second embodiment of the present invention.
Figure 6:
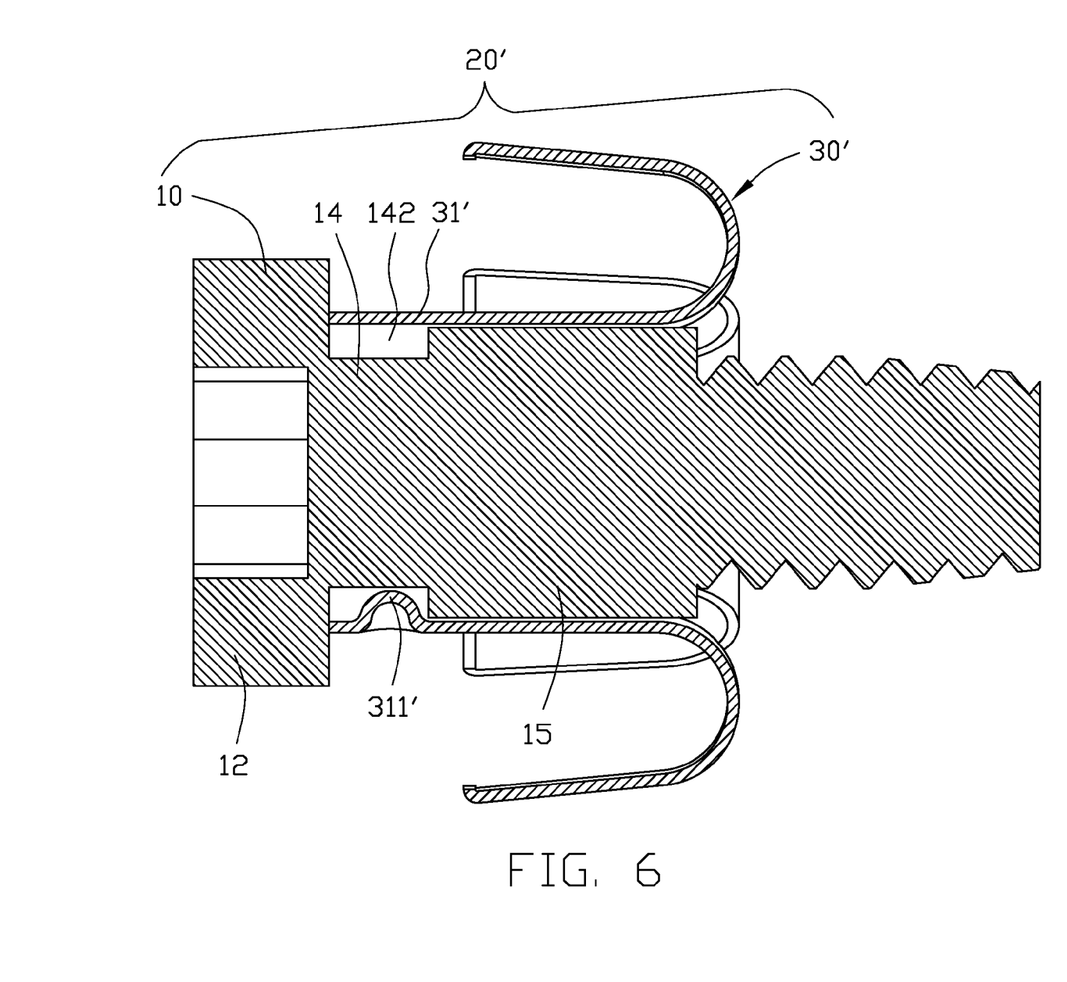
FIG. 6 is a cross-sectional view of the resilient gasket of FIG. 5 assembled with the fastener of FIG. 1.

Referring to FIGS. 5, and 6, a shock absorber 20' in accordance with a second embodiment of the present invention includes the fastener 10 and a resilient gasket 30'. The resilient gasket 30' includes a circular axial portion 31' and a plurality of "U"-shaped resilient tabs 35' extending from a circular edge of the axial portion 31'. A plurality of resilient positioning protrusions 311' protrudes from an inner surface of the axial portion 31'. Similar to gap 37 defined in the axial portion 31, a gap 37' is defined in the axial portion 31', but along a zigzag path. The axial portion 31' is slightly smaller in diameter than the shaft 15 of the fastener 10.

In assembly, the fastener 10 is aligned with the resilient gasket 30'. The shaft 15 of the fastener 10 is inserted in the axial portion 31' of the resilient gasket 30' and presses the axial portion 31' to deform the axial portion 31', which forms a larger area to receive the shaft 15 of the fastener 10. The shaft 15 of the fastener 10 is pushed into the axial portion 31' until the positioning protrusions 311' of the axial portion 31' engage with the notch 142 of the fastener 10, thereby forming the shock absorber 20'.

Figure 7:
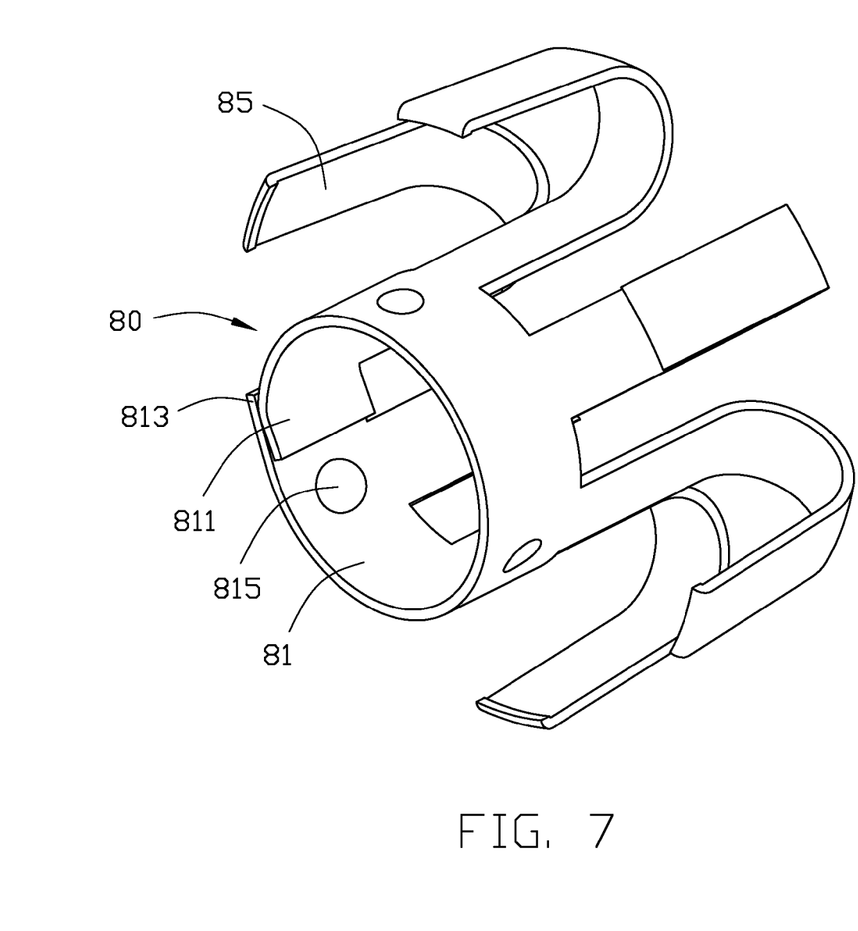
FIG. 7 is an isometric view of a resilient gasket of a shock absorber of a third embodiment of the present invention.

Referring to FIG. 7, a resilient gasket 80 of a shock absorber in accordance with a third embodiment of the present invention for engaging with the fastener 10, includes an axial portion 81 and a plurality of "U"-shaped resilient tabs 85 extending from a circular edge of the axial portion 81. A plurality of resilient positioning protrusions 815 protrudes from an inner surface of the axial portion 81 for engaging with the notch 142 of the fastener 10. The axial portion 81 is formed by a plate bent in a circle with two free ends 811, 813 overlapping each other. The axial portion 81 is slightly smaller in diameter than the shaft 15 of the fastener 10.

Figure 8:
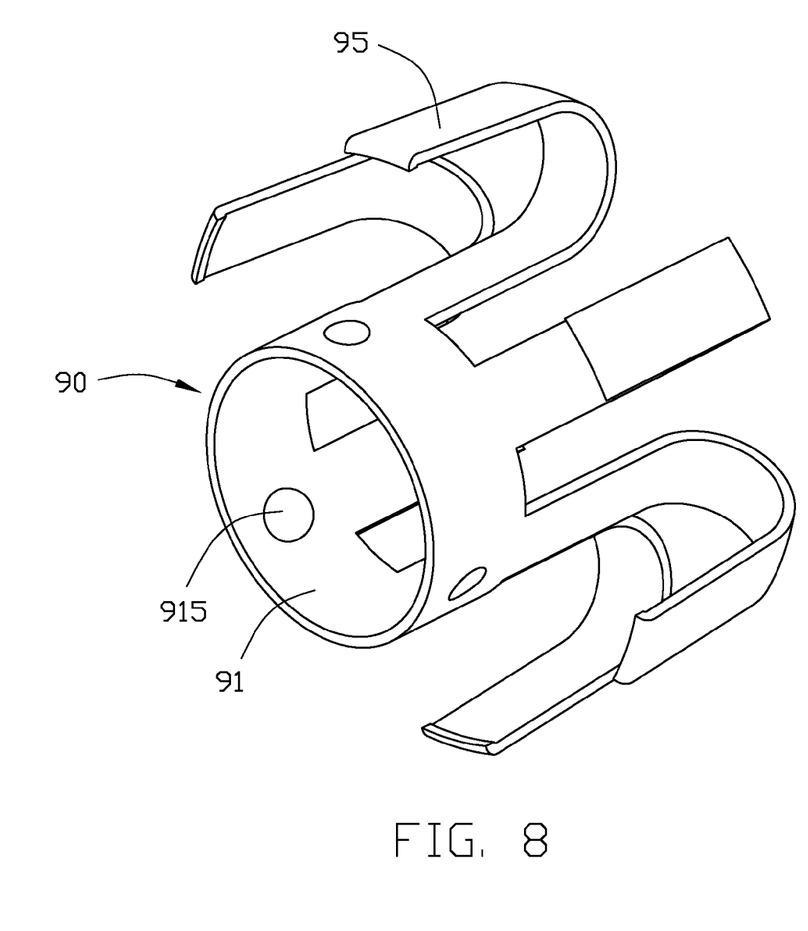
FIG. 8 is an isometric view of a resilient gasket of a shock absorber of a fourth embodiment of the present invention.

Referring to FIG. 8, a resilient gasket 90 of a shock absorber in accordance with a fourth embodiment of the present invention for engaging with the fastener 10, includes an axial portion 91 and a plurality of "U"-shaped resilient tabs 95 extending from a circular edge of the axial portion 91. A plurality of resilient positioning protrusions 915 protrudes from an inner surface of the axial portion 81 for engaging in the notch 142 of the fastener 10. The axial portion 91 is a closed circle. The diameter of the axial portion 91 is approximately equal to that of the shaft 15 of the fastener 10.

It is to be understood that elements from the three embodiments, to the degree practical, could potentially be combined and/or interchanged, so long as the resulting embodiment met the general operating requirements of at least one embodiment.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A shock absorber comprising:
a fastener comprising a shaft; and
a resilient gasket for receiving the fastener, the gasket comprising:
an axial portion surrounding and resiliently clipping the shaft of the fastener; and
a plurality of resilient tabs extending from the axial portion, each resilient tab comprising an extending portion extending from the axial portion, a bent portion extending outward from the extending portion, and a resilient contacting portion further extending backward from the bent portion and keeping a distance from the extending portion in a direction vertical to the axial direction of the fastener;
wherein a gap is defined in the axial portion and extends through the axial portion to make the axial portion resiliently deformable, and the axial portion resiliently clips the shaft.

2. The shock absorber as described in claim 1, wherein the fastener comprises a head and a connecting portion extending from the head, the shaft of the fastener extending from the connecting portion, the connecting portion being smaller in diameter than the head and the shaft, thereby forming a notch thereamong, and the axial portion of the gasket forms at least one resilient positioning protrusion on an inner surface thereof, for engaging in the notch of the fastener.

3. The shock absorber as described in claim 2, wherein the axial portion is circular, and a gap cuts through the axial portion of the gasket to make the axial portion resiliently deformable, the axial portion smaller in diameter than the shaft.

4. The shock absorber as described in claim 3, wherein the gap follows a zigzag path.

5. The shock absorber as described in claim 2, wherein the axial portion is formed as a circle with two free ends overlapping each other, and the axial portion is smaller in diameter than the shaft.

6. The shock absorber as described in claim 2, wherein the axial portion is a closed circle, and the axial portion is generally equal in diameter to the shaft.

7. A shock absorber comprising:
a screw comprising a head and a shank; and
a resilient gasket comprising:
a shank holding portion surrounding and resiliently clipping the shank of the screw; and
a plurality of resilient U-shaped strips each including a first and a second leg of the U, the first legs being connected with the shank holding portion, the second legs extending toward the head of the screw;
wherein a gap is defined in the shank holding portion and extends through the shank holding portion to make the shank holding portion resiliently deformable, and the shank holding portion resiliently clips the shank.

* * * * *